US011887519B1

(12) United States Patent
Wallace et al.

(10) Patent No.: US 11,887,519 B1
(45) Date of Patent: Jan. 30, 2024

(54) ROLLABLE OLED WITH CUSTOM CURVATURE

(71) Applicant: Lenovo (Singapore) Pte. Ltd., New Tech Park (SG)

(72) Inventors: Brian William Wallace, Wake Forest, NC (US); Samuel Patterson, Raleigh, NC (US); Kathryn Cubrilovic, Raleigh, NC (US); John Travis Wettroth, Chapel Hill, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/820,206

(22) Filed: Aug. 16, 2022

(51) Int. Cl.
*G09G 3/00* (2006.01)
*G06F 3/14* (2006.01)
*G09G 3/3208* (2016.01)

(52) U.S. Cl.
CPC ............ *G09G 3/035* (2020.08); *G06F 3/1446* (2013.01); *G09G 3/3208* (2013.01); *G09G 2354/00* (2013.01)

(58) Field of Classification Search
CPC .. G09G 3/035; G09G 3/3208; G09G 2354/00; G06F 3/1446; G06F 1/1681; G06F 1/1652; G06F 1/1616; G06F 1/1641; G09F 13/0454; G09F 9/301; G02F 1/133305; H04M 1/0268; H04M 1/0216
See application file for complete search history.

(56) References Cited

U.S. PATENT DOCUMENTS

| 2012/0307423 A1* | 12/2012 | Bohn | H04M 1/0268 |
| | | | 361/679.01 |
| 2015/0055287 A1* | 2/2015 | Seo | H04M 1/0216 |
| | | | 361/679.27 |
| 2015/0146385 A1* | 5/2015 | Kim | G02F 1/133305 |
| | | | 361/749 |
| 2017/0215272 A1* | 7/2017 | Kyung | G09F 9/301 |
| 2018/0124937 A1* | 5/2018 | Choi | G06F 1/1652 |
| 2019/0265758 A1* | 8/2019 | Han | G06F 1/1681 |
| 2019/0346889 A1* | 11/2019 | Chen | G06F 1/1616 |
| 2020/0170128 A1* | 5/2020 | Kim | G06F 1/1681 |
| 2020/0212326 A1* | 7/2020 | Eom | G09F 13/0454 |
| 2020/0344897 A1* | 10/2020 | Kim | G06F 1/1641 |

FOREIGN PATENT DOCUMENTS

WO   WO-2022227159 A1 *  11/2022

* cited by examiner

*Primary Examiner* — Richard J Hong
(74) *Attorney, Agent, or Firm* — Kunzler Bean & Adamson

(57) ABSTRACT

Apparatuses, methods, systems, and program products are disclosed for enabling a rollable OLED screen extension with custom curvature. An apparatus includes an OLED screen capable of rendering an OLED image, a first rollable OLED screen extension including a support structure that can be flexed to form a first curvature, a processor, and coupled to the processor, a memory that stores code executable by the processor to enable a user to extend the first rollable OLED screen extension in a first direction.

20 Claims, 6 Drawing Sheets

ROLLABLE OLED WITH CUSTOM CURVATURE

FIELD

The subject matter disclosed herein relates to a rollable organic light-emitting diode ("OLED") system and more particularly relates to a rollable OLED system with custom curvature.

BACKGROUND

Rollable OLED systems may include many different display devices, such as televisions, mobile phones, desktop monitors, etc., which may be extended in a direction or directions to a single maximum distance in each direction or directions with a fixed displayed image size and single straight orientation. There is no customized user control over the extension distance and no customized curvature of the extended screen portion.

BRIEF SUMMARY

Apparatuses, methods, systems, and program products are disclosed for enabling OLED display of an image with a customized rollable screen extension. An apparatus includes an OLED screen capable of rendering an OLED image, a first rollable OLED screen extension including a support structure that can be flexed to form a first curvature, a processor, and coupled to the processor, a memory that stores code executable by the processor to enable a user to extend the first rollable OLED screen extension in a first direction.

A method, in one embodiment, includes enabling a user to control an OLED screen capable of rendering an OLED image and to flex an extended first rollable OLED screen extension to form a first curvature.

A program product, in one embodiment, includes computer readable storage medium that stores code executable by a processor. In one embodiment, the code is executable by the processor to enable a user to control an OLED screen capable of rendering an OLED image and to flex a first rollable OLED screen extension to form a curvature of the first rollable OLED screen extension.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be limiting of scope, the embodiments will be described and explained with additional specificity and detail using the accompanying drawings, in which.

DETAILED DESCRIPTION

Figure 1A:
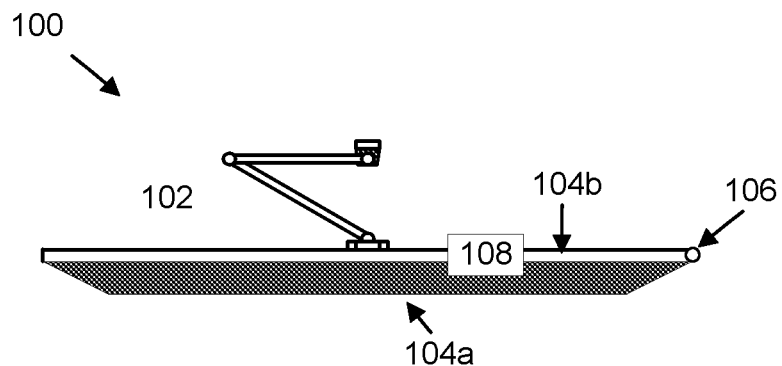
FIGS. 1a-c illustrate one embodiment of an OLED system for enabling a user to flex an extended OLED device.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The apparatuses, methods, systems, program products, and their respective embodiments disclosed herein enable rollable OLED with customized curvature. The description of elements in each figure may refer to elements of proceeding figures. Like numbers refer to like elements in all figures, including alternate embodiments of like elements. These elements function according to the previous description.

Figure 1B:
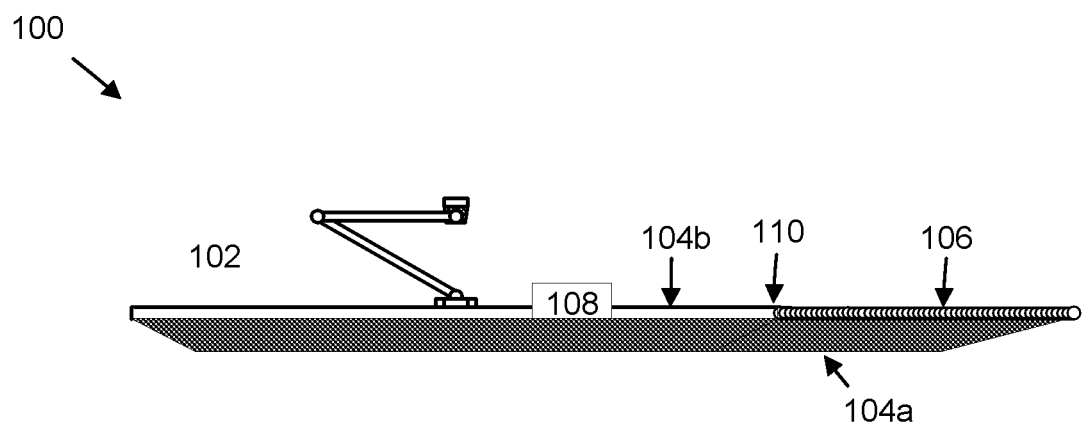
Figure 1C:
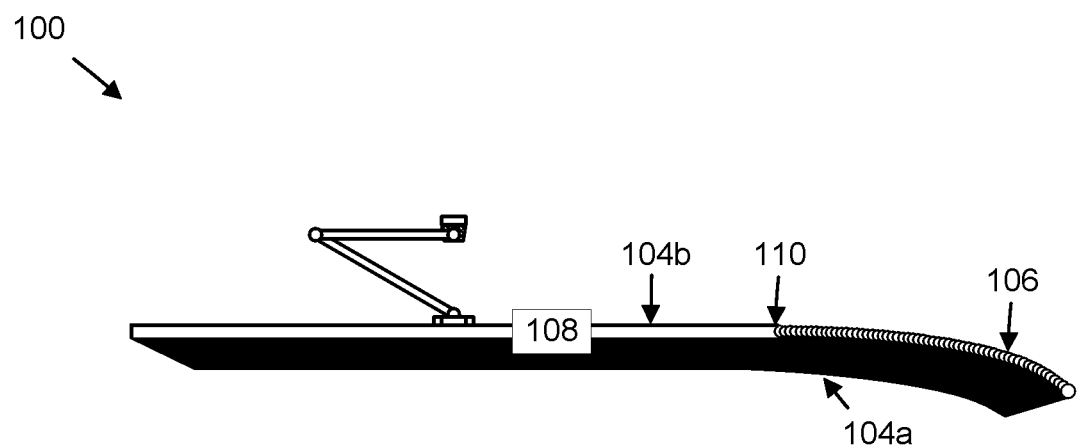

FIGS. 1a-c illustrate one embodiment of an OLED system for enabling a user to flex an extended OLED device. In one embodiment, the OLED device 102 includes an OLED screen 104a (not extended as shown in FIG. 1a), which is capable of displaying an OLED image and is supported by a frame 102b, a rollable OLED screen extension 106, an OLED module 108, and a sensor 110.

Even though OLED device 102 of FIGS. 1a-b depicts one configuration of a specific number of components, including the OLED screen 104a, the rollable OLED screen extension 106, the OLED module 108, and the sensor 110, one of skill in the art will recognize that several OLED screens 104, rollable OLED screen extensions 106, rollable OLED controllers 108, and sensors 110 may be included in the OLED system 102 to achieve desired system goals or configurations. In addition, though this embodiment shows in FIG. 1b a single OLED screen expanded in one direction to a certain screen size or aspect ratio, one of skill in the art will recognize that the screen size could be expanded in multiple directions using multiple rollable OLED screen extensions 106. One such embodiment with a seamless rollable OLED screen 104a (including both the OLED screen 104a and the rollable OLED screen portions or extensions 106a,b) is shown and discussed in more detail regarding FIGS. 3a-c. Depending upon the desired configuration, in some embodiments, multiple expansions may include seams between the OLED screen 104a and any or all rollable OLED screen extensions 106.

In some embodiments, the OLED device 102 may be an integrated component of a desktop computer, laptop computer, personal digital assistant (PDA), tablet computer, smart phone, smart display, vehicle on-board computer, or the like. In some embodiments, the OLED device 102 may include its own internal processor, and coupled to the processor, an internal memory that stores code executable by the processor to run various programs, modules, or applications and to perform various functions.

In other embodiments, as discussed further herein, the OLED device 102 may be coupled and/or controlled via physical electronic components or wirelessly to a desktop computer, laptop computer, personal digital assistant (PDA), tablet computer, smart phone, smart display, vehicle on-board computer, or the like. In some embodiments, the OLED device 102 may be controlled by a processor on another device, and coupled to the processor, a memory on another device or in the cloud, which memory stores code executable by the processor to run various programs, modules, or applications and to perform various functions.

In one embodiment, as shown in FIGS. 1a-c, the OLED screen 104a includes the rollable OLED screen extension 106. For example, as shown in FIG. 1b, the OLED screen 104a may be a continuous OLED screen, which expands the OLED screen 104a to the extent that the rollable OLED screen extension 106 is extended. The rollable OLED screen extension 106 unrolls a seamless OLED screen 104a as the rollable OLED screen extension 106 is extended outwardly from the minimum size to a customized screen size (out to a maximum extension length).

The OLED screen 104a may be manufactured in accordance with one of many aspect ratios, which may be adapted or customized to different display different aspect ratios as discussed herein. The OLED frame 104b may be manufactured in one of many form factors that are known and commonly used within the image or video display industry. For example, the OLED screen 104a may have an aspect ratio of 16:9 or 4:3, but with the extension, the new display may achieve an anamorphic widescreen format such as 2.39:1, or the like. One of skill in the art should recognize that many formats or aspect ratios can be implemented using the principles discussed herein. The aspect ratio does not necessarily need to align precisely with the screen size, however. The expanded screen allows for more flexibility in displaying images or video in various aspect ratios.

The rollable OLED screen extension 106, in FIGS. 1a-c, includes a rollable support structure that further includes multiple elongated overlapping plates 112 connected by multiple friction hinges (not shown). When the rollable OLED screen extension 106 extends beyond the OLED screen 104a, the multiple plates mechanically engage to support and protect the extended OLED screen 104a from damage. The elongated overlapping plates 112 and interconnected multiple friction hinges enable the user to flex the rollable OLED screen extension 106 toward the user to form a curvature of the rollable OLED screen extension 106 as shown in FIG. 1c. This enhances the viewing angle of the image or video displayed on the OLED screen 102. A more detailed discussion of the overlapping plates 112 and customized curvature follows regarding FIG. 2.

The rollable OLED screen extension 106 may be driven by a motor that is controlled by the OLED module 108. The motor can be internal to the OLED device 102 or to the rollable OLED screen extension 106 or housed within another device and mechanically engaged with the rollable OLED screen extension 106.

The OLED module 108, in one embodiment, may comprise various processors or processor cores, memory, storage, network connectivity chips, graphics chips, audio chips, and/or the like. The OLED device 102 may include an internal embodiment of the OLED module 108, or in some embodiments, the OLED module 108 may be housed separately. For example, in one embodiment, the OLED module 108 could be housed as part of a desktop computer that is coupled to and controls an OLED screen 104a. The OLED module 108, in one embodiment, may be an independent module or may be an extension that adds to another computer program previously loaded on the OLED device 102 or another coupled device such as a desktop computer. The OLED module 108 enables user-controlled management and customization of rollable OLED screen extensions 106 as explained in more detail herein.

In some embodiments, the OLED screen 104a and OLED module 108 include middleware (i.e., software between the operating system of the OLED screen 104a and a program or an application either running on the OLED screen 104a or running on another device within the OLED device 102). Such middleware facilitates communication between the operating system and such applications and/or devices. For example, middleware might include drivers, which convert the hardware's analog operations to digital signals that the software of the OLED screen 104a can then understand and use consistent with a framework established by the operating system.

Figure 4:
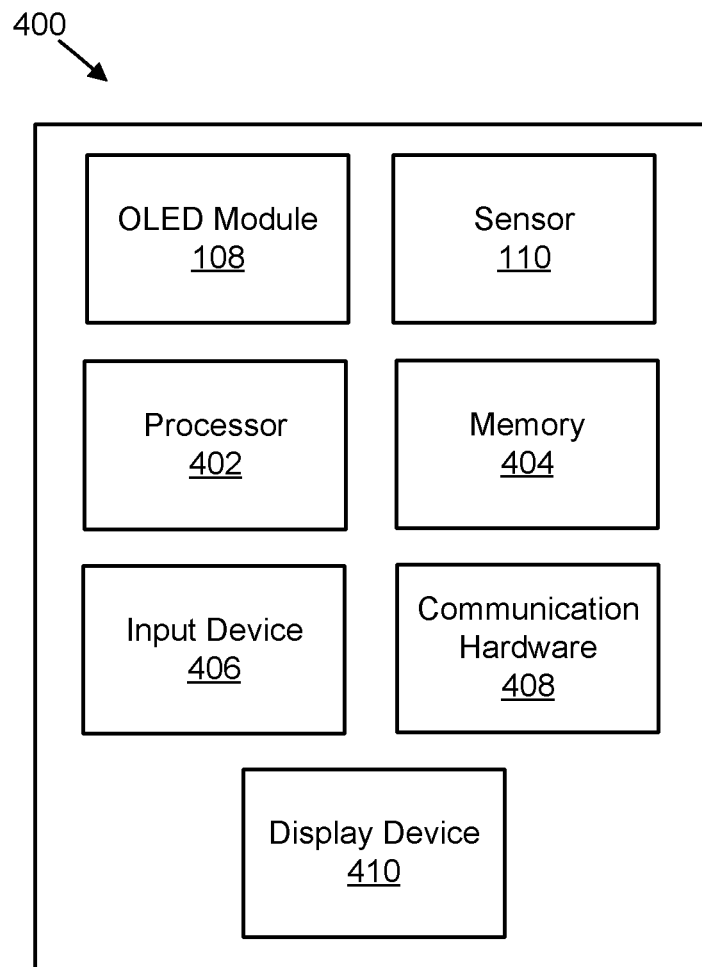
FIG. 4 depicts one embodiment of the apparatus 400 for enabling user-customized control of OLED screen curvature and/or extension.

As explained regarding FIG. 4, the OLED device 102 enables the user to configure and customize settings or to make real-time adjustments to the configuration of the rollable OLED screen extensions 106. In one embodiment, the user may have an interface, which can be arranged in many ways according to the preference of the user or system designer. These may include drag and drop features, or a list format of components and their relationships to each other. The user interface may also include toggle switches, press and hold buttons to assert functions, or the like. Such switches, buttons, or the like may be implemented in logical or physical versions.

In one embodiment, the OLED device 102 includes sensor 110, which tracks how far the OLED screen extension 104 has been extended and sends this data to the OLED module 108. The OLED module 108 then uses this information to automatically adjust the size of the image displayed on the OLED screen 104a. The OLED module 108 may also make adjustments according to data it receives such as metadata, user preferences, or a combination of user preferences and sensor 110 feedback as is explained in more detail herein. The sensor 110, in one embodiment, may attach to the rollable OLED screen extension 106 or may attach to the OLED support frame 104b, or both.

For simplification, FIGS. 1a-c do not illustrate a network and servers, but one of skill in the art will readily understand that control signals (e.g., to extend or contract the rollable OLED screen extension 106) may be transmitted via one or more networks and may be stored or further processed on one or more servers. The data network, in one embodiment, includes a digital communication network that transmits digital communications. The data network may include a wireless network, such as a wireless cellular network, a local wireless network, such as a Wi-Fi network, a Bluetooth® network, a near-field communication ("NFC") network, an ad hoc network, and/or the like. The data network may include a WAN, a storage area network ("SAN"), a LAN, an optical fiber network, the internet, or other digital communication network. The data network may include two or more networks. The data network may include one or more servers, routers, switches, and/or other networking equipment. The data network may also include computer readable storage media, such as a hard disk drive, an optical drive, non-volatile memory, RAM, or the like.

In embodiments where the wireless connection is a mobile telephone/cellular network, the network may be configured as a 4G network, a 5G network, a long-term evolution ("LTE") based network, and/or the like. In such an embodiment, the mobile telephone network may create and manage wireless connections between base access units for the network and user equipment ("UE") devices for the user. The wireless connection may also employ a Wi-Fi network based on any one of the Institute of Electrical and Electronics Engineers ("IEEE") 802.11 standards.

The one or more servers may be embodied as blade servers, mainframe servers, tower servers, rack servers, and/or the like. The one or more servers may be configured as mail servers, web servers, application servers, FTP servers, media servers, data servers, web servers, file servers, virtual servers, and/or the like.

Figure 2:
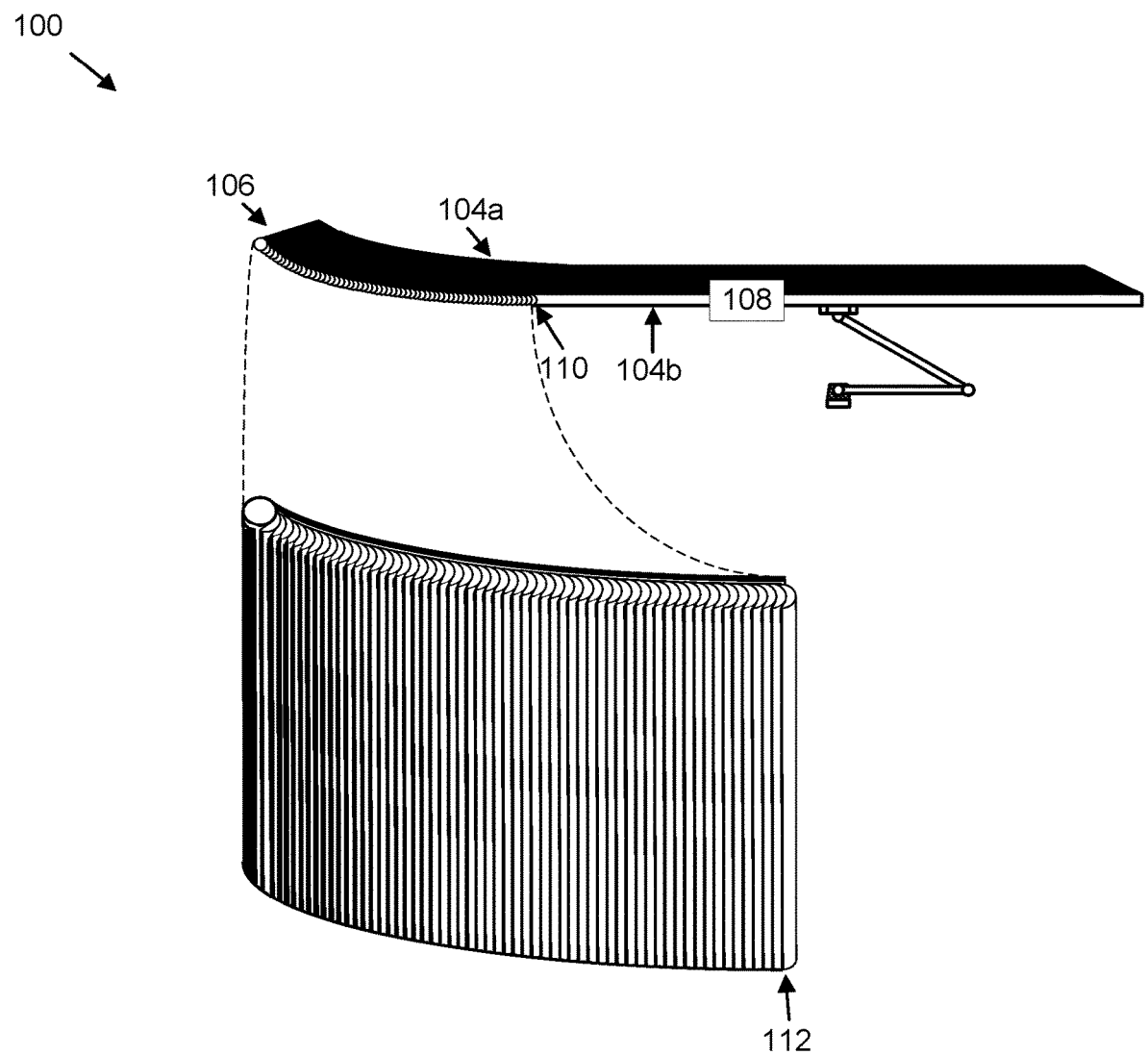
FIG. 2 illustrates one embodiment of an OLED apparatus for enabling user-customized curvature of rollable OLED.

FIG. 2 illustrates a detailed view of one embodiment of the support frame or structure 104b of a rollable OLED screen extension 106. In this embodiment, each of the elongated plates 112 is interconnected to the next elongated plate 112 with friction hinges (not shown). This configuration of plates 112 and the friction of the hinges provides the necessary support to maintain the OLED screen 104a in place when the rollable OLED screen extension 106 is extended to any length up to the maximum length as discussed herein. Each of the elongated plates 112 is also constructed so that the user may flex it to a point but not beyond, so as to protect the integrity of the OLED screen 104a. As is shown, due to the configuration of the elongated plates, the user may adjust an extended rollable OLED screen extension 106 to enhance the viewing angle of the extended portion.

Figure 3A:
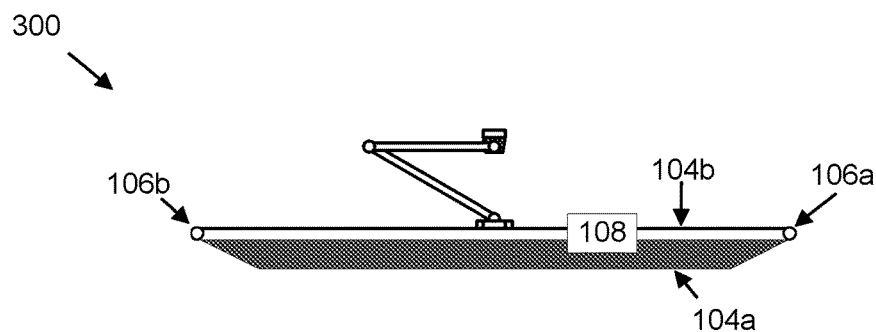
FIGS. 3a-c illustrate one embodiment of an OLED apparatus for enabling rollable OLED with customized extension in multiple directions as well as independently customized curvatures of the rollable OLED screen extensions.
Figure 3B:
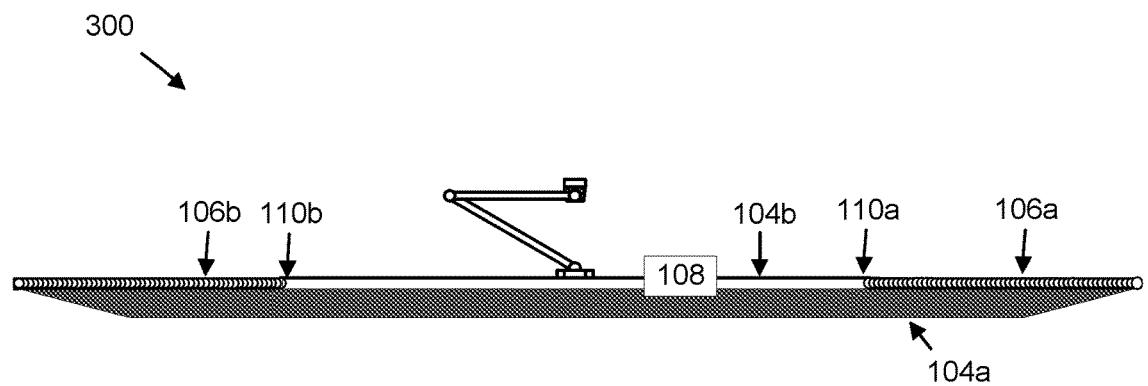
Figure 3C:
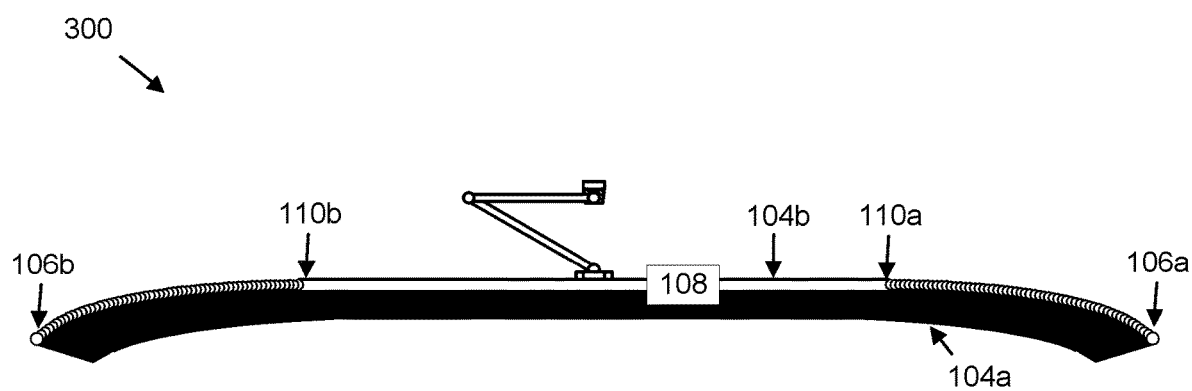

FIGS. 3a-c illustrate one embodiment of an OLED apparatus for enabling rollable OLED with customized extension in multiple directions as well as independently customized curvatures of the rollable OLED screen extensions 106a,b. In one embodiment, the OLED apparatus 300 includes an OLED screen 104a (not extended as shown in FIG. 3a) capable of displaying an OLED image and supported by a frame 104b, a first rollable OLED screen extension 106a in one direction, a second rollable OLED screen extension 106b in a second direction, the OLED module 108, the first sensor 110a, and a second sensor 110b.

In some embodiments, the OLED apparatus 300 may be an integrated component of a desktop computer, laptop computer, personal digital assistant (PDA), tablet computer, smart phone, smart display, vehicle on-board computer, or the like. In some embodiments, the OLED apparatus 300 may include its own internal processor, and coupled to the processor, an internal memory that stores code executable by the processor to run various programs, modules, or applications and to perform various functions.

In other embodiments, as discussed further herein, the OLED apparatus 300 may be coupled and/or controlled via physical electronic components or wirelessly to a desktop computer, laptop computer, personal digital assistant (PDA), tablet computer, smart phone, smart display, vehicle on-board computer, or the like. In some embodiments, the OLED apparatus 300 may be controlled by a processor on another device, and coupled to the processor, a memory on another device or in the cloud, which memory stores code executable by the processor to run various programs, modules, or applications and to perform various functions.

In one embodiment, as shown in FIGS. 3a-c, the OLED screen 104a includes both of the rollable OLED screen extensions 106a,b. For example, as shown in FIG. 3b, the OLED screen 104a may be a continuous OLED screen, which expands the OLED screen 104a to the extent that the user customizes the extension of both of the rollable OLED screen extensions 106a,b. The rollable OLED screen extensions 106a,b unroll a seamless OLED screen 104a as the rollable OLED screen extensions 106a,b are extended outwardly from the minimum size to a customized screen size (out to a maximum extension length in each direction).

The user may independently customize the extension length of each of the rollable OLED screen extensions 106a,b. For example, the user may customize one side to full extension and the other side to partial extension. The user may alternatively choose to extend only one extension and leave the other extension rolled up.

As shown in FIGS. 3b-c, the user may extend both rollable OLED screen extensions 106a,b to any preferred length up to maximum lengths (as shown). Once extended to the user's customized or preferred length(s), the user may then apply light force to flex or adjust either or both rollable OLED screen extensions 106a,b to form respective curvatures therein (as shown in FIG. 3c). This curvature enhances the viewing angle of the OLED screen 104a.

As discussed above, each of the rollable OLED screen extensions 106a,b includes a support structure, which as discussed regarding the embodiment shown in FIG. 2, includes the elongated overlapping plates 112 connected by friction hinges to hold the rollable OLED screen extension 106a,b in the preferred position set by the user. The support structures also prevent damaging the rollable OLED screen extensions 106a,b by over adjustment.

The rollable OLED screen extensions 106a,b may be driven by a motor or motors that are controlled by the OLED module 108. The motor(s) can be internal to the OLED apparatus 300 or to the rollable OLED screen extensions 106a,b or housed within another device and mechanically engaged with the rollable OLED screen extensions 106a,b. In one embodiment, the OLED screen extensions 106a,b may be adjusted manually by the user.

The OLED apparatus 300, in one embodiment, includes the sensors 110a,b, which are used to independently to track how far each of the OLED screen extensions 106a,b has been extended, respectively. The OLED module 108 uses data from the sensors 110a,b to automatically adjust the image displayed to fit the expanded OLED screen 104a and/or the desired aspect ratio.

FIG. 4 depicts one embodiment of the apparatus 400 for enabling user-customized control of OLED screen curvature. The apparatus 400, in one embodiment, includes an OLED module 108, sensors 110a,b, a processor 402, a memory 404, an input device 406, and communication hardware 408. Although the apparatus 400 depicts a specific number of OLED modules 108, sensors 110, processors 402, memories 404, input devices 406, communication hardware 408, and display devices 410, one of skill in the art will recognize that any number of OLED modules 108, sensors 110, processors 402, memories 404, input devices 406, communication hardware 408, or display devices 410 may be included in the apparatus 400.

The OLED module 108 and sensors 110 function essentially as described above. In one embodiment, the OLED module 108 and sensors 110 are attached directly to the OLED screen 104a, the frame 104b, or the rollable OLED screen extensions 106, but rather are coupled thereto. The OLED device 102 may use the OLED module 108 for enabling user control of rollable OLED screen extension curvature and/or extension. As may be appreciated, the OLED module 108 may include computer hardware, firmware, or software, or a combination of these.

The OLED module 108 may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the OLED module 108 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the OLED device 102.

In one embodiment, the sensors 110a,b may sense if there are any obstructions within the path of the OLED screen extensions 104a,b. In one embodiment, the sensors 108a,b may include lasers to reflect off and sense objects within the desired path trajectory. In another embodiment, the sensors 108a,b may detect a change in pressure indicating that an object is preventing the rollable OLED screen extensions 104a,b from extending to their respective desired lengths.

The processor 402, in one embodiment, may include any known controller capable of executing computer-readable instructions and/or capable of performing logical operations. For example, the processor 402 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 402 executes instructions stored in the memory 404 to perform the methods and routines described herein. The processor 402 is communicatively coupled to the memory 404, the input device 406, the communication hardware 408, the display device 410.

The memory 404, in one embodiment, is a computer readable storage medium. In some embodiments, the memory 404 includes volatile computer storage media. For example, the memory 404 may include a RAM, including dynamic RAM ("DRAM"), synchronous dynamic RAM ("SDRAM"), and/or static RAM ("SRAM"). In some embodiments, the memory 404 includes non-volatile computer storage media. For example, the memory 404 may include NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like. In some embodiments, the memory 404 includes both volatile and non-volatile computer storage media.

In some embodiments, the memory 404 stores data and/or metadata relating to enabling user-customized control of rollable OLED extension. In some embodiments, the memory 404 also stores program code and related data, such as an operating system or other middleware or controller algorithms operating on the apparatus 400.

The input device 406, in one embodiment, may include any known computer input device including a touch panel, a button, a keyboard, a stylus, or the like. In some embodiments, the input device 406 may be integrated with the display device 410, for example, as a touchscreen or similar touch-sensitive display. In one embodiment, the input device 406 may be a user interface for setting preferences or customizing desired rollable OLED extension curvature, extension, or desired aspect ratio configurations.

In some embodiments, the input device 406 includes a touchscreen such that user input, including customized extension lengths of one or more rollable OLED screen extensions 106, may be input using a virtual keyboard or mouse displayed on the touchscreen and/or by touching on the touchscreen. In one embodiment, the input device 406 includes voice recognition software to record the user input into the user interface. In some embodiments, the input device 406 includes two or more different devices, such as a keyboard and a touch panel.

In one embodiment, the user may interact with OLED device 102 using an interface including a combination of the input device 406 and display device 410 to adjust the viewing settings, such as desired screen size or aspect ratio, chromaticity, contrast, etc. In embodiments with multiple rollable OLED screen extensions 106, the user may designate a desired extension length for each direction or may choose a desired aspect ratio or screen size, and OLED module 108 can automatically adjust the multiple rollable OLED screen extensions 106 to adapt to the aspect ratio selected by the user. In some embodiments, the OLED module 108 can use the metadata to determine the aspect ratio of the original video content and automatically adjust the multiple rollable OLED screen extensions 106 to fit the aspect ratio of the original video content.

The communication hardware 408 may facilitate communication with or control by other devices. For example, the communication hardware 408 may enable communication via Bluetooth®, Wi-Fi, WAN, and so forth. The wireless connection may also employ a Wi-Fi network based on any one of the Institute of Electrical and Electronics Engineers ("IEEE") 802.11 standards. In some embodiments, the communication hardware 408 may enable communication with a server (not shown). In one embodiment, the communication hardware may be used to input user preferences and to make modifications to the OLED screen extension length from a remote device or a mobile device. For example, the OLED screen 104a may be part of a TV that is controlled in part by a mobile phone having an application that is compatible with control features of the OLED module 108. The user may enter a desired aspect ratio or preset configuration for rollable OLED screen extensions 106 from a mobile phone, for example.

The display device 410, in one embodiment, may include any known electronically controllable display or display device. The display device 410 may be designed to portray visual data (e.g., OLED screen extension settings) or make adjustments via the user interface discussed above. For example, the display device 410 may include, but is not limited to, an LCD display, an LED display, an OLED screen, a projector, or similar display device capable of outputting communicative input to a user. As another, non-limiting, example, the display device 410 may include a wearable display such as a smart watch, smart glasses, a heads-up display, or the like. Further, the display device 410 may be a component of a smart phone, a personal digital assistant, a television, a table computer, a notebook (laptop) computer, a personal computer, a vehicle dashboard, an in-wall display, or the like. In one embodiment, the display device 410 may be a user interface that pops up on the OLED screen 104a.

In certain embodiments, the display device 410 includes one or more speakers for producing sound. For example, the display device 410 may produce an audible alert or notification (e.g., a beep or chime). In some embodiments, the display device 410 includes one or more haptic devices for producing vibrations, motion, or other haptic feedback. For example, the display device 410 may produce haptic feedback upon performing an action, such as beginning or completing extension of the rollable OLED screen extensions 106.

In some embodiments, all or portions of the display device 410 may be integrated with the input device 406. For example, the input device 406 and display device 410 may form a touchscreen or similar touch-sensitive display. In other embodiments, the display device 410 may be located near the input device 406. In certain embodiments, the display device 410 may receive instructions and/or data for output from the processor 402 and/or the OLED module 108.

Figure 5:
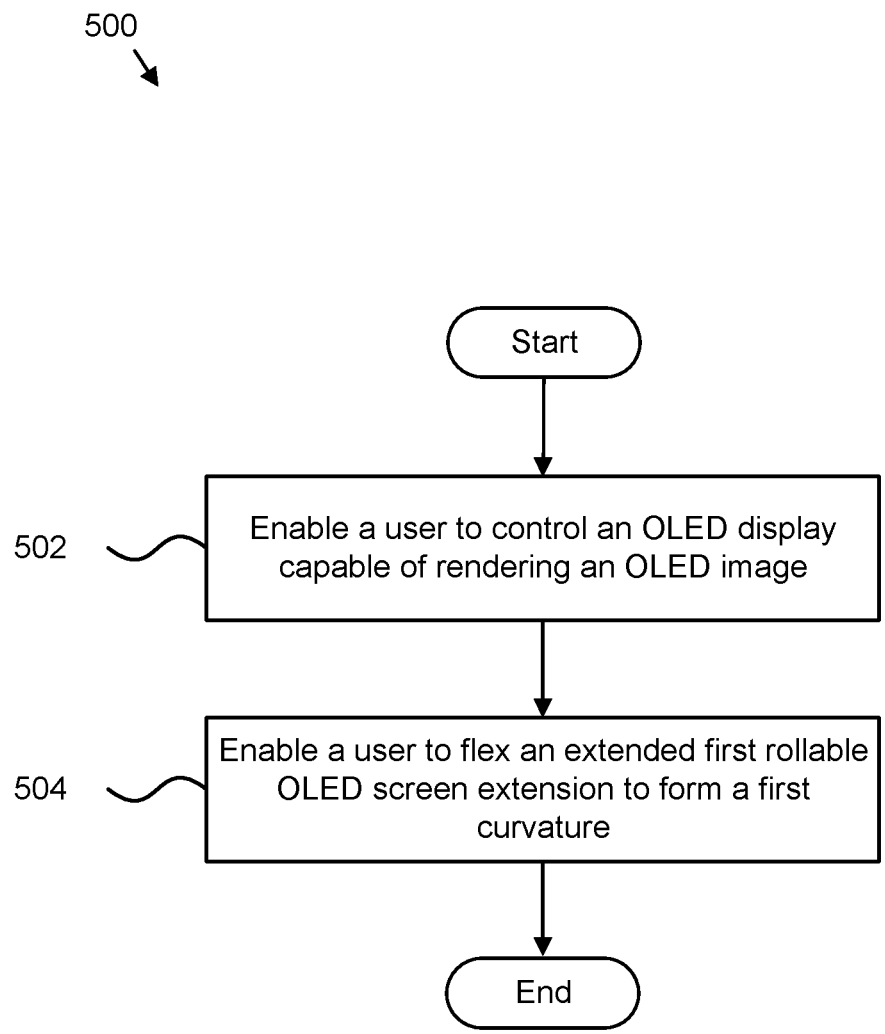
FIG. 5 is a flow chart diagram illustrating an embodiment of a method 500 for enabling user-controlled management of rollable OLED screens.

FIG. 5 is a flow chart diagram illustrating an embodiment of a method 500 for enabling user-controlled management of rollable OLED screens. In some embodiments, the method 500 is performed by an apparatus, such as the OLED device 102. In other embodiments, the method 500 may be performed by a module, such as the OLED module 108. In some embodiments, the method 500 may be performed by distributed OLED modules 108. In certain embodiments, the method 500 may be performed by a processor executing program code, for example, a microcontroller, a microprocessor, a CPU, a GPU, an auxiliary processing unit, a FPGA, or the like.

In one embodiment, the method 500 begins and enables a user to control 502 an OLED screen capable of rendering an OLED image. The method 500 continues and enables 504 the user to flex an extended first rollable OLED screen extension to form a first curvature.

In some embodiments, the method 500 may continue and customize a range of extension for the first rollable OLED screen extension in a first direction. In one embodiment, the method 500 may continue and detect a range of extension for the first rollable OLED screen extension and adjust the OLED image based upon the range of extension for the first rollable OLED screen extension. In some embodiments, the method may continue and sense an obstruction within a path of the range of extension for the first rollable OLED screen extension and adjust extension of the first rollable OLED screen extension based upon the sensed obstruction.

In some embodiments, the method 500 may continue and customize a range of extension for a second rollable OLED screen extension in a second direction. In some embodiments, the method 500 may continue and detect the range of extension for the second rollable OLED screen extension and adjust the OLED image based upon the range of extension for the second rollable OLED screen extension. In some embodiments, the method 500 may continue and sense an obstruction within a path of the range of extension for the second rollable OLED screen extension and adjust extension of the second rollable OLED screen extension based upon the sensed obstruction.

In one embodiment, the method may continue and enable a user to customize a third range of extension for a third rollable OLED screen extension in a third direction, and to detect the third range of extension for the third rollable OLED screen extension and adjust the OLED image based upon the range of extension for the third rollable OLED screen extension.

Figure 6:
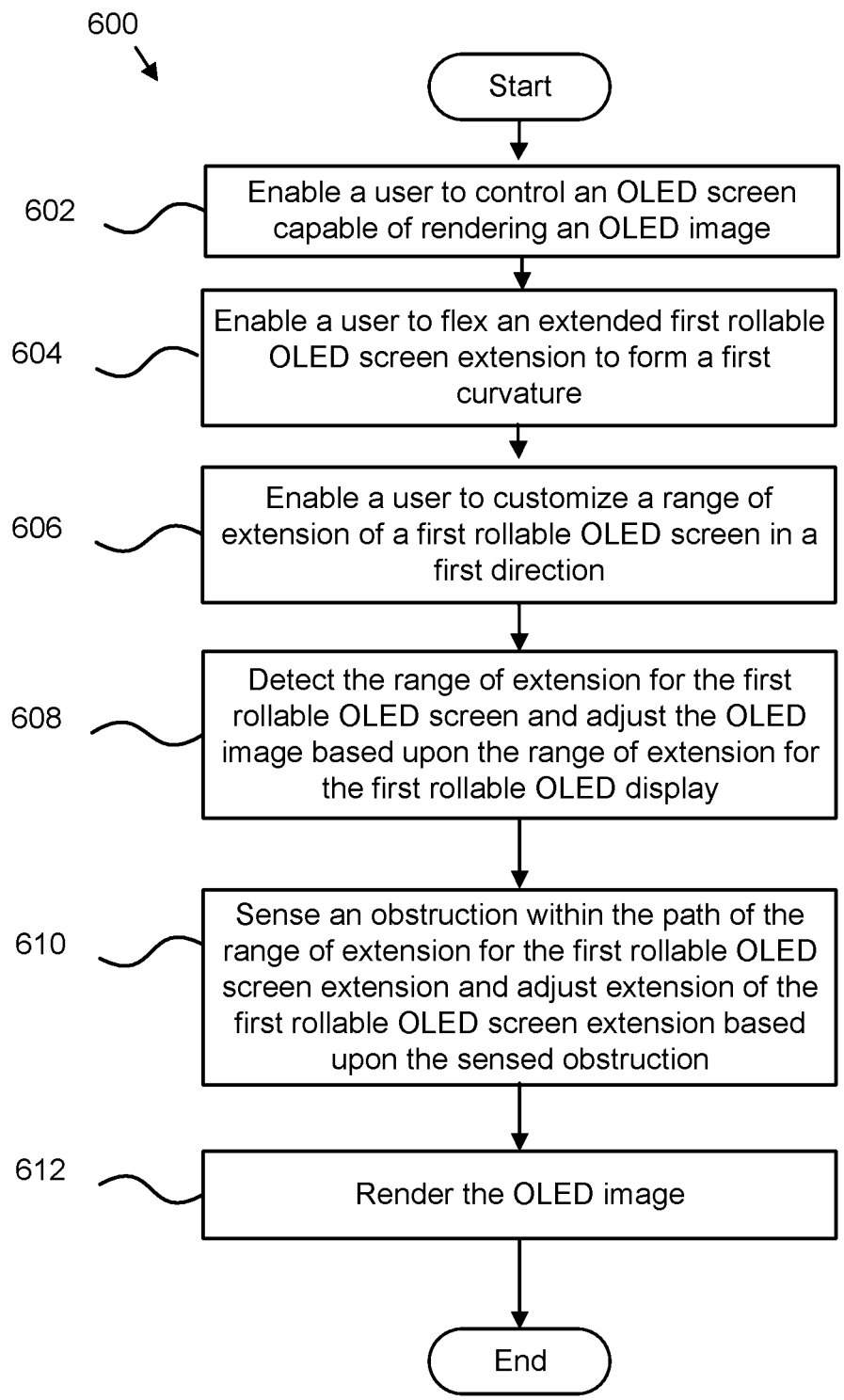
FIG. 6 is a flow chart diagram illustrating an embodiment of a method 600 for enabling user-customized control of rollable OLED screens.

FIG. 6 is a schematic flow chart diagram illustrating an embodiment of a method 600 for enabling user-customized control of rollable OLED screens. In some embodiments, method 600 is performed by an apparatus, such as the OLED device 102. In certain embodiments, the method 600 may be performed by a processor executing program code, for example, a microcontroller, a microprocessor, a CPU, a GPU, an auxiliary processing unit, a FPGA, or the like.

In one embodiment, the method 600 begins and enables 602 a user to control an OLED screen capable of rendering an OLED image. The method 600 continues and enables 604 the user to flex an extended first rollable OLED screen extension to form a first curvature. The method 600 continues and enables 606 a user to customize a range of extension of a first rollable OLED screen in a first direction. The method 600 continues and detects 608 the range of extension for the first rollable OLED screen extension and adjusts the OLED image based upon the range of extension for the first rollable OLED screen extension. The method 600 continues and senses 610 an obstruction within the path of the range of extension for the first rollable OLED screen extension and adjusts extension of the first rollable OLED screen extension based upon the sensed obstruction The method 600 continues and renders 612 the OLED image on the extended screen.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    an OLED screen capable of rendering an OLED image;
    a first rollable OLED screen extension coupled to an edge of the OLED screen and including a support structure having a plurality of elongated overlapping plates adapted to flex to form a first curvature, wherein the OLED image is expanded to the extent that the first rollable OLED screen extension is extended, and wherein the first rollable OLED screen extension is self-supporting when extended;
    a processor;
    a memory, coupled to the processor, that stores code executable by the processor to extend the first rollable OLED screen extension in a first direction.

2. The apparatus of claim 1, wherein the support structure of the first rollable OLED screen further includes a plurality of friction hinges, wherein each of the plurality of friction hinges interconnects one of the plurality of elongated overlapping plates with a next of the plurality of elongated overlapping plates.

3. The apparatus of claim 1, wherein the code is executable by the processor to customize an independent first range of extension of the first rollable OLED screen.

4. The apparatus of claim 3, wherein the code is executable by the processor to detect the range of extension for the first rollable OLED screen.

5. The apparatus of claim 4, wherein the code is executable by the processor to enable the first rollable OLED screen extension to adjust the OLED image based upon the range of extension for the first rollable OLED screen extension.

6. The apparatus of claim 1, wherein the code is executable by the processor to sense an obstruction within a path of the range of extension for the first rollable OLED screen extension and to halt further extension of the first rollable OLED screen extension.

7. The apparatus of claim 1 further comprising a second rollable OLED screen extension including a support structure, which includes a combination of friction hinges and overlapping plates, wherein the support structure is adapted to flex to form a second curvature, and wherein the code is executable by the processor to independently extend the second rollable OLED screen extension in a second direction.

8. The apparatus of claim 7, wherein the code is executable by the processor to enable the user to customize and detect an independent second range of extension of the second rollable OLED screen extension.

9. The apparatus of claim 8, wherein the code is executable by the processor to enable the second rollable OLED screen extension to independently adjust the OLED image based upon the range of extension for the second rollable OLED screen extension.

10. The apparatus of claim 7, further comprising at least one additional rollable OLED screen extension having a support structure including a combination of friction hinges and overlapping plates adapted to flex to form an additional curvature, wherein the code is executable by the processor to enable the user to customize and detect an additional independent range of extension for the at least one additional rollable OLED screen extension in at least one additional direction.

11. The apparatus of claim 10, wherein the code is executable by the processor to enable the at least one additional rollable OLED screen extensions to independently adjust the OLED image based upon the ranges of extension for the three or more rollable OLED screen extensions.

12. A method, comprising:
    enabling a user to control an OLED screen capable of rendering an OLED image; and
    enabling a user to flex a first rollable OLED screen extension to form a curvature, wherein the first rollable OLED screen extension is coupled to an edge of the OLED screen and includes a support structure having a plurality of elongated overlapping plates adapted to flex to form the curvature, wherein the OLED image is expanded to the extent that the first rollable OLED screen extension is extended, and wherein the first rollable OLED screen extension is self-supporting when extended.

13. The method of claim 12, further comprising enabling the user to customize a range of extension for the first rollable OLED screen extension in a first direction.

14. The method of claim 13, further comprising enabling the user to customize a range of extension for a second rollable OLED screen extension coupled to an edge of the OLED screen, wherein the second rollable OLED screen extension is adapted to be extended in a second direction.

15. The method of claim 14, further comprising detecting the range of extension for the second rollable OLED screen extension and adjusting the OLED image based upon the range of extension for the second rollable OLED screen extension.

16. The method of claim 14, further comprising sensing an obstruction within a path of the range of extension for the second rollable OLED screen extension and adjusting extension of the second rollable OLED screen extension based upon the sensed obstruction.

17. The method of claim 14, further comprising enabling the user to customize at least one additional range of extension for at least one additional rollable OLED screen extension in at least one additional direction and detecting the at least one additional range of extension for the at least one additional rollable OLED screen extension and adjusting the OLED image based upon the range of extension for the at least one additional rollable OLED screen extension.

18. The method of claim 12, further comprising detecting a range of extension for the first rollable OLED screen extension and adjusting the OLED image based upon the range of extension for the first rollable OLED screen extension.

19. The method of claim 18, further comprising sensing an obstruction within a path of the range of extension for the first rollable OLED screen extension and adjusting extension of the first rollable OLED screen extension based upon the sensed obstruction.

20. A program product comprising a computer readable storage medium that stores code executable by a processor, the executable code comprising code to:

enable a user to control an OLED screen capable of rendering an OLED image; and enable the user to flex a first rollable OLED screen extension coupled to an edge of the OLED screen such that the first rollable OLED screen extension forms a curvature, wherein the first rollable OLED screen extension includes a support structure having a plurality of elongated overlapping plates adapted to flex to form the curvature, wherein the OLED image is expanded to the extent that the first rollable OLED screen extension is extended, and wherein the first rollable OLED screen extension is self-supporting when extended.

* * * * *